US011166228B2

(12) United States Patent
Wakabayashi

(10) Patent No.: US 11,166,228 B2
(45) Date of Patent: Nov. 2, 2021

(54) COMMUNICATIONS SYSTEM, INFRASTRUCTURE EQUIPMENT, COMMUNICATION TERMINAL AND METHOD

(71) Applicant: Sony Corporation, Tokyo (JP)

(72) Inventor: Hideji Wakabayashi, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 16 days.

(21) Appl. No.: 16/571,188

(22) Filed: Sep. 16, 2019

(65) Prior Publication Data

US 2020/0015155 A1 Jan. 9, 2020

Related U.S. Application Data

(63) Continuation of application No. 16/404,756, filed on May 7, 2019, now Pat. No. 10,462,736, which is a (Continued)

(30) Foreign Application Priority Data

Dec. 23, 2013 (EP) ..................................... 13199482

(51) Int. Cl.
*H04W 48/18* (2009.01)
*H04W 4/70* (2018.01)
(Continued)

(52) U.S. Cl.
CPC ............. *H04W 48/18* (2013.01); *H04W 4/70* (2018.02); *H04W 48/16* (2013.01); *H04W 88/02* (2013.01); *H04W 88/06* (2013.01); *H04W 88/08* (2013.01)

(58) Field of Classification Search
CPC ....... H04W 48/18; H04W 4/70; H04W 48/16; H04W 88/06; H04W 88/02; H04W 88/08
See application file for complete search history.

(56) References Cited

U.S. PATENT DOCUMENTS

| 9,736,762 B2* | 8/2017 | Sirotkin ................ H04W 48/18 |
| 2010/0003980 A1* | 1/2010 | Rune ..................... H04W 48/16 455/436 |

(Continued)

FOREIGN PATENT DOCUMENTS

WO 2012/142437 A1 10/2012

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 11 )", 3GPP TS 36.331 V11.3.0, Mar. 2013, 344 pages.

(Continued)

*Primary Examiner* — Hashim S Bhatti
(74) *Attorney, Agent, or Firm* — Xsensus LLP

(57) ABSTRACT

A communications system communicating data to/from a communications terminal includes plural wireless communications networks to transmit/receive signals to/from the communications terminal via wireless access interfaces. The communications terminal receives from an access server selection information for selecting one of the wireless communications networks, for transmitting or receiving the data in accordance with the selection information in combination with one or more determined measurements of the wireless access interface of the wireless communications networks. The access server includes an indication of a preferred communications characteristic for transmitting or receiving the signals representing the data, and in accordance with the preferred communications characteristic the communications terminal adapts the determined measurements and selects one of the wireless communications networks which most closely satisfy the preferred communications characteristic in accordance with the adapted-determined measurements.

19 Claims, 10 Drawing Sheets

Related U.S. Application Data continuation of application No. 15/025,386, filed as application No. PCT/EP2014/073152 on Oct. 28, 2014, now Pat. No. 10,334,517.

(51) Int. Cl.
*H04W 48/16* (2009.01)
*H04W 88/06* (2009.01)
*H04W 88/02* (2009.01)
*H04W 88/08* (2009.01)

(56) References Cited

U.S. PATENT DOCUMENTS

| | | | | | |
|---|---|---|---|---|---|
| 2012/0324100 | A1* | 12/2012 | Tomici | ............... | H04W 28/0268 709/224 |
| 2013/0065555 | A1* | 3/2013 | Baker | ................ | G06Q 10/103 455/410 |
| 2013/0084855 | A1* | 4/2013 | Ekici | ................ | H04W 52/0245 455/432.1 |
| 2014/0153546 | A1* | 6/2014 | Kim | ................ | H04W 48/18 370/332 |
| 2014/0161103 | A1 | 6/2014 | Sirotkin et al. | | |
| 2014/0204909 | A1* | 7/2014 | Cheng | ............... | H04W 36/0066 370/331 |
| 2014/0233386 | A1* | 8/2014 | Jamadagni | ............ | H04W 36/22 370/235 |
| 2015/0085650 | A1* | 3/2015 | Cui | ................ | H04W 28/08 370/230 |
| 2015/0098393 | A1* | 4/2015 | Tofighbakhsh | ......... | H04W 4/50 370/329 |
| 2015/0105076 | A1 | 4/2015 | Gupta et al. | | |
| 2015/0111569 | A1* | 4/2015 | Gupta | ................ | H04W 4/90 455/426.1 |
| 2015/0373729 | A1* | 12/2015 | Lee | ................ | H04W 72/082 370/329 |
| 2016/0066251 | A1* | 3/2016 | Sirotkin | ............... | H04W 8/005 370/328 |
| 2017/0374667 | A1* | 12/2017 | Batchu | ................ | H04W 88/06 |

OTHER PUBLICATIONS

"3rd Generation Partnership Project; Technical Specification Group Core Network and Terminals; Access Network Discovery and Selection Function (ANDSF) Management Object (MO), (Release 10)", 3GPP TS 24.312 V10.5.0, Mar. 2012, 156 pages.

"3rd Generation Partnership Project; Technical Specification Group Core Network and Terminals; Access to the 3GPP Evolved Packet Core (EPC) via non-3GPP access networks; Stage 3 (Release 12)", 3GPP Standard; 3GPP TS 24.302, 3rd Generation Partnership Project (3GPP), vol. CT WG1, No. V12.3.0, XP050729088, Dec. 19, 2013, pp. 1-82.

"3rd Generation Partnership Project; Technical Specification Group Core Network and Terminals; Access to the 3GPP Evolved Packet Core (EPC) via non-3GPP access networks; Stage 3, (Release 10)", 3GPP TS 24.302 V10.7.0, Mar. 2012, 58 pages.

"3rd Generation Partnership Project; Technical Specification Group Services and System Aspects; Architecture enhancements for non-3GPP accesses, (Release 10)", 3GPP TS 23.402 V10.7.0, Mar. 2012, 232 pages.

Alcatel-Lucent: "Policy Based Terminal Triggered. ANDSF Decided Access Selection", 3GPP Draft; S2-081658 Revision of 1355 ANDSF Discussion-V2. 3rd Generation Partnership Project (3GPP), vol. SA WG2, No. Athens; Feb. 16, 2008, XP050263998, Feb. 2008, 6 pages.

Holma et al., "System Architecture Based on 3GPP SAE", LTE for UMTS OFDMA and SC-FDMA Based Radio Access, Wiley, 2009, pp. 25-27.

International Search Report and Written Opinion dated Apr. 8, 2015 for PCT/EP2014/073152.

* cited by examiner

Minimizing UE power consumption policy the bid-based selection procedure

Sequence chart of rule-based UE initiated cell selection

COMMUNICATIONS SYSTEM, INFRASTRUCTURE EQUIPMENT, COMMUNICATION TERMINAL AND METHOD

CROSS-REFERENCE TO RELATED APPLICATIONS

This application is a continuation of U.S. application Ser. No. 16/404,756, filed May 7, 2019, which is a continuation of U.S. application Ser. No. 15/025,386, filed on Mar. 28, 2016 know U.S. Pat. No. 10,334,517), which is based on PCT filing PCT/EP2014/073152, filed on Oct. 28, 2014, and claims priority to EP 13199482.4, filed on Dec. 23, 2013, the entire contents of each are incorporated herein by reference.

FIELD OF THE DISCLOSURE

The present invention relates to communications systems, infrastructure equipment, and communications terminals for communicating data, and methods of communicating data.

BACKGROUND OF THE DISCLOSURE

Extending mobile communications network coverage, increasing network capacity, and increasing the variety of devices served are all aspects for which improvement is desired of next generation mobile communications networks. This increase in capacity and variety of devices may in turn lead to a significant increase in the number of communications devices served by mobile communications networks. For example, the increased capacity and coverage of next generation communications networks such as 3GPP long term evolution (LTE) have led to proposals for the use of machine type communications (MTC) devices. MTC devices are typically low-data rate devices that only occasionally communicate with infrastructure equipment in a communications network and may for example be smart utility meters and information gathering devices in cars or personal medical equipment. Accordingly, because of the potential ubiquity of MTC devices, their use may lead to large increases in the number of communications devices being served by a network.

It is known that a communication terminal may access more than one communications network to transmit or to receive data, and furthermore the communications networks may be of different types. These may be 3GPP communications networks or non-3GPP communications networks. At present a communications terminal is arranged to attach to a particular network for communicating data in accordance with rules determined by an Access Network Discovery and Selection Function (ANDSF), which is programmed by an operator which has provided the communications terminal to a user.

SUMMARY OF THE DISCLOSURE

According to an example embodiment of the present disclosure, a communications system communicates data to and from a communications terminal. The communications system comprises a plurality of wireless communications networks arranged to transmit signals to and receive signals from the communications terminal via wireless access interfaces. An access server is configured to provide selection information to communications terminals representing rules for selecting one of the wireless communications networks to transmit data to or receive data from the wireless communications network. The communications terminal is configured to receive from the access server the selection information for selecting one of the wireless communications networks, which the communications terminal should access for transmitting or receiving the data, to determine one or more measurements of the wireless access interfaces of the wireless communications networks, and to select one of the wireless communications networks for transmitting or receiving the data in accordance with the selection information in combination with the one or more determined measurements of the wireless access interface of the wireless communications networks. The access server is provided with an indication of a preferred communications characteristic for transmitting or receiving the signals representing the data, and in dependence upon the preferred communications characteristic the access server is configured to adapt the selection information transmitted to the communications terminal for selecting the one of the wireless communications networks, and in accordance with the preferred communications characteristic the communications terminal is configured to adapt the determined measurements, and to select one of the wireless communications networks which most closely satisfies the preferred communications characteristic in accordance with the adapted-determined measurements.

According to some examples of the present technique a communications terminal is provided with selection information from an access server such as an Access Network Discovery and Selection Function (ANDSF) for determining which of a plurality of communications networks the communications terminal should use to transmit or to receive data, the selection information being adapted in accordance with the preferred communications characteristic of the communications terminal. Furthermore the measurement performed by the communications terminal to select one of the wireless access networks is also adapted in accordance with the preferred communications characteristic.

In some examples the preferred communications characteristic may be for example that the communications terminal is a type which requires a reduced power consumption, or will transmit delay tolerant data or has a low or no mobility. In some examples, the preferred communications characteristic may be implied from the type or class of the communications terminal such as whether it is an MTC type device.

The determined measurements may be an indication of a type of wireless access interface provided by the wireless communications networks and/or a current status of the wireless communications networks to transmit or to receive data from the communications terminals. Accordingly the communications terminal can select a most appropriate one of the wireless communications networks based upon, for example, the capability of the communications terminal, the application for which the communications terminal is being used and accordingly which of the wireless communications networks is most appropriate for the communications terminal.

Various further aspects and embodiments of the disclosure are provided in the appended claims, including, but not limited to, a communications terminal, infrastructure equipment and methods of communicating data between a communications terminal and in infrastructure equipment.

BRIEF DESCRIPTION OF THE DRAWINGS

Embodiments of the present disclosure will now be described by way of example only with reference to the accompanying drawing in which like parts are provided with corresponding reference numerals and in which.

DETAILED DESCRIPTION OF EXAMPLE EMBODIMENTS

Figure 1:
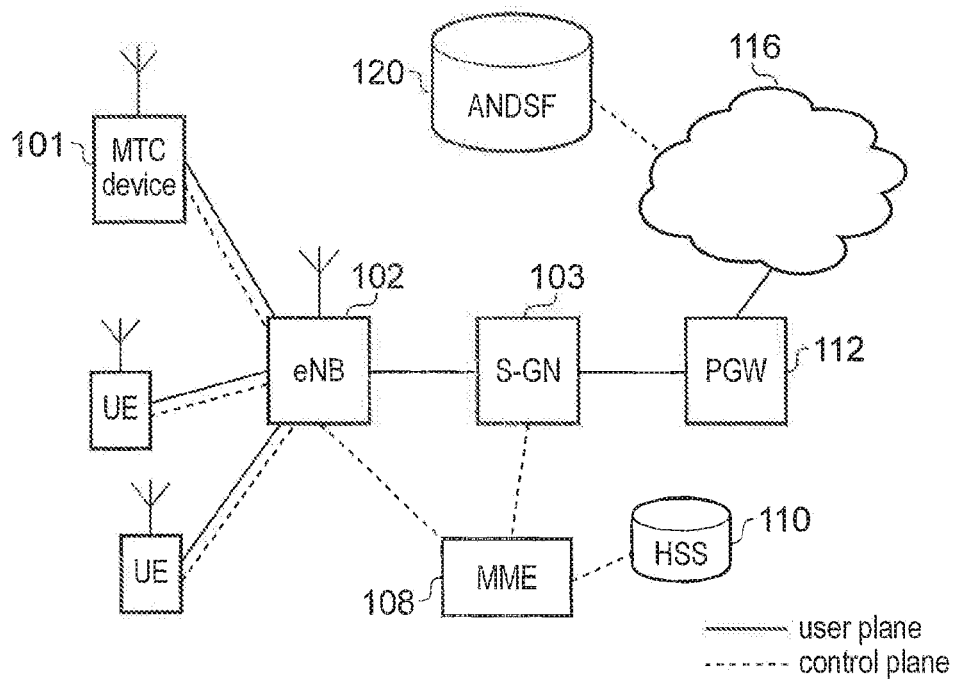
FIG. 1 provides a schematic block diagram of an example communications system.

Embodiments of the present technique will now be described with reference to an implementation which uses a mobile communications network operating in accordance with the 3GPP Long Term Evolution (LTE) standard. FIG. 1 provides the example architecture of an LTE network. As shown in FIG. 1 and as with a conventional mobile communications network, mobile communications devices (UE) 101 are arranged to communicate data to and from infrastructure equipment 102. The infrastructure equipment 102 may also be referred to as a base station or an enhanced node B (eNodeB) and the communications terminals may be referred to as user equipment (UE), mobile devices and user devices etc., where these devices may take the form of smart phones, tablet computers or machine type communications (MTC) devices for example. In some examples the communications network of FIG. 1 may operate in accordance with 3GPP Long Term Evolution (LTE) where the communication terminals also operate in accordance with LTE. Therefore in the following description, by way of example, LTE/SAE terminology and names are used. However embodiments of the present technique can be applied to other mobile communications systems such as UNITS and GERAN with the GPRS core network.

The base stations or eNodeB's 102 are connected to a serving gateway S-GW 106 which is arranged to perform routing and management of mobile communications services to the communications devices 101 as they roam throughout the mobile communications network. In order to maintain mobility management and connectivity, a mobility management entity (MME) 108 manages the enhanced packet service (EPS) connections with the communications devices 101 using subscriber information stored in a home subscriber server (HSS) 110. Other core network components include a packet data gateway (P-GW) 112 which connects to an internet network 116. More information may be gathered for the LTE architecture from the book entitled *"LTE for UMTS OFDM and SC-FDMA based radio access"*, Holma H. and Toskala A. page 25 ff.

The term communications device may be used throughout this description or alternatively the term user equipment (UE) may be used for the communications device or terminal. These expressions may be used interchangeably to refer to equipment which transmits or receives data via a communications network.

Also shown in FIG. 1 is the packet gateway 112 which is connected via an internet connection 116 to an Access Network Discovery and Selection Function (ANDSF) 120. The ANDSF contains data management and control functionality which is necessary to provide network discovery and selection assistance data to the user equipment 101 in accordance with an operator's policy. The ANDSF 120 responds to a UE 101 requests for access network discovery information in a pull mode and maybe able to initiate data transfer to the UE in a push mode based on network triggers or as a result of previous communication with a UE 101.

Figure 2:
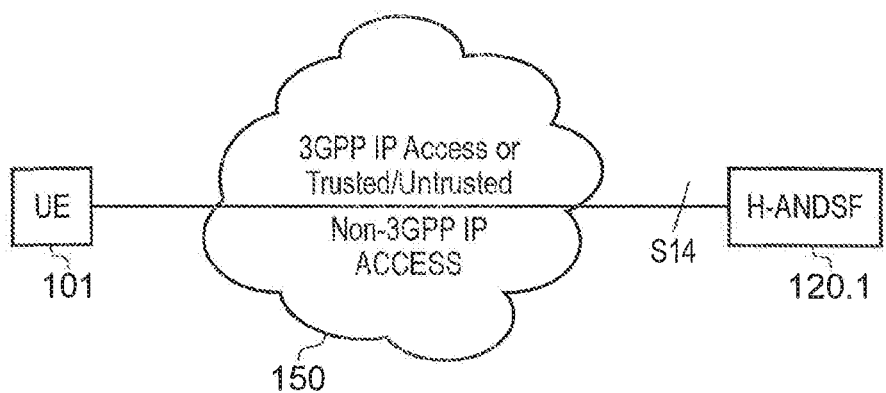
FIG. 2 provides a simplified illustration of a communications terminal (UE) communicating via a 3GPP IP access network or a non-3GPP IP access network to and ANDSF server as part of a home network.

There are two modes in which the ANDSF 120 may operate depending on whether the UE 101 has roamed from a home network to a visited network. FIG. 2 provides an example illustration of a network in which the UE 101 is still attached to its home network and receives information from ANDSF 120.1 whereas in the example of FIG. 3 the UE 101 has roamed to a visited network. As shown in FIG. 2, the UE 101 may connect to an ANDSF 120.1 via either a 3GPP IP access through a trusted network or via a non-trusted non-3GPP IP access network such as via a Wi-Fi link, blue tooth or Zigbee or other wireless access interface 150. However, for the example shown in FIG. 2 the UE 101 has remained within its home network and therefore accesses the home ANDSF 120.1. In contrast in FIG. 3 the UE has roamed to a visited network and therefore accesses both the home ANDSF 120.1 and a visited ANDSF 120.2 in order to receive information directing the UE to attach and communicate via either a 3GPP IP access trusted network or via an untrusted non-3GPP IP access network 150. In either case the UE 101 is communicating via a standardized interface S14 which is explained in 3 GPP technical specification TS23.402 at section 4.8.

Figure 3:
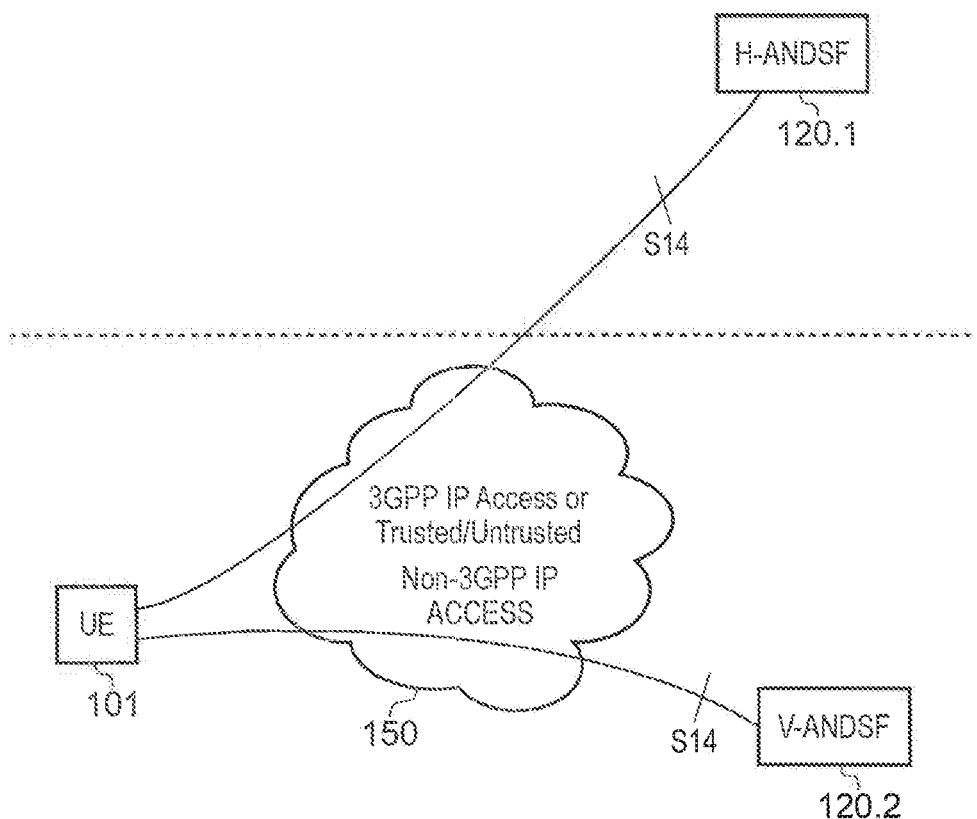
FIG. 3 provides a simplified illustration of a communications terminal (UE) communicating with an ANDSF server via a 3GPP IP access network or non-3GPP access network, which the communications terminal has roamed to a visited network.

For either of the two cases shown in FIG. 2 or 3 in which the UE 101 receives information from the ANDSF from its home ANDSF 120.1 or a visited ANDSF 120.2, the UE 101 is directed to attached to a particular network, in accordance with a rule or direction received from the visited ANDSF 120.2 in combination with information or a rule received from the home ANDSF 120.1.

Figure 4:
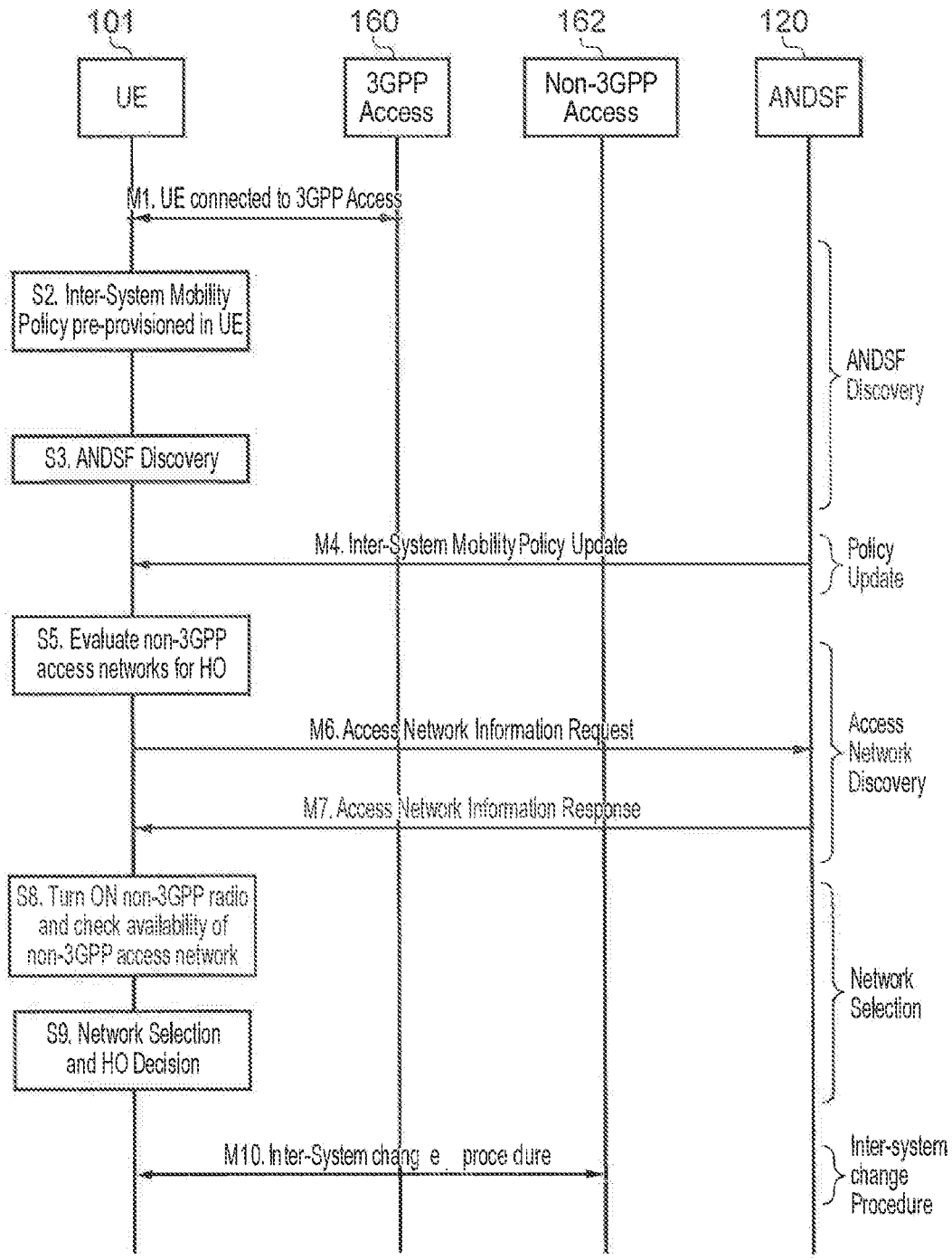
FIG. 4 provides a message flow diagram illustrating an inter-system change between a 3GPP network and non-3GBP network as defined in TS 24.302.

To this end, an example message flow diagram illustrating a message exchange between the UE 101 and the ANDSF 120 is shown in FIG. 4. The message flow diagram shown in FIG. 4 is taken from 3GPP TS24.302 the 10.7.0 (2012 Mar.) and refers to an access to a 3GPP evolved packet core (EPC) via a non-3GPP access networks for inter-system change between 3GPP access network and non-3GPP access network. In the signalling flow an inter-system change procedure between 3GPP access network and non-3GPP access network using information obtained from ANDSF is made. In this example the UE uses DHCP query to obtain the IP address of the ANDSF. However, the communication between the UE and ANDSF server does not imply use of any specific protocol.

The procedure shown in FIG. 4 is summarized as follows:
M1. Initial connectivity: The UE is connected to 3GPP network, the connection allowing the UE to access the ANDSF server 120 to perform an ANDSF discovery in steps S2 and S3. The current applications are supported over the 3GPP access network. The procedure remains the same if the UE is initially connected to non-3GPP access network and wants to change to 3GPP access network.
S2. Pre-provisioned policies: The inter-system mobility policy is pre-provisioned on the UE already. Based on pre-provisioned operator policies the UE has preference for different non-3GPP networks such as WLAN, and WiMAX. The UE can select these access networks when they are available.
S3. ANDSF Discovery: ANDSF discovery is performed in accordance with a known procedure, for example as described in subclause 6.8.2.2.1 of TS24.302. The UE can discover ANDSF using DHCP query options as specified in IETF RFC 6153, where ANDSF may be identified with a specific sub-option code. Optionally, the home operator can provide ANDSF information and security parameters for application layer authentication. Transport security is ensured by establishing an https tunnel between the UE and ANDSF.
M4. Policy Update based on Network Triggers: Based on network triggers the ANDSF sends an updated inter-system mobility policy to the UE. The inter-system mobility policy includes validity conditions, for example conditions indicating when the policy is valid. Such conditions can include time duration, location area, etc.
S5. Evaluate which non-3GPP networks to discover: The inter-system mobility policies specify the access networks that the UE can select; the UE has both WLAN and WiMAX radios. In this case, the inter-system mobility policy provided by the operator allows the UE to select either WLAN or WiMAX networks under all conditions. The UE, taking into account of the UE's local policy, e.g. user preference settings, access history, obtains information about availability of both WLAN and WiMAX access networks in its vicinity.
M6. Access Network Information Request: The UE 101 sends a request to the ANDSF 120 to get information about available access networks. The UE 101 also includes its location information in the request. ANDSF 120 can limit the information sent to UE 101 based on internal settings.
M7. Access Network Information Response: The ANDSF sends a response to the UE which includes the list of available access networks types (in order of operator preferences), access network identifier and PLMN identifier. In this case the ANDSF responds with availability of both WLAN and WiMAX network in the vicinity of the UE.
S8. Evaluate candidate non-3GPP networks: Based on the received information received from the ANDSF 120 and the UE's local policy, the UE evaluates if it is within the coverage area of the available access networks in the order of preferences. In this case, based on the history and radio quality of WiMAX, the UE prefers WiMAX over WLAN access type. The UE powers on the WiMAX radio and checks for the presence of WiMAX network. The UE can listen to WiMAX broadcast messages (uplink/downlink channel data messages) and determines the presence of WiMAX network. Since the WiMAX network is the preferred network and since the UE has verified the presence of WiMAX network, the UE does not check for presence of WLAN network.
S9. Non-3GPP Network Selection. The UE selects the most preferred available access network for inter-s % stem mobility. In this case the UE selects the WiMAX access network.
M10. Inter-system change Procedure: The UE initiates inter-system change procedure to the selected non-3GPP access network. 11e details of the inter-system change procedure are described in 3GPP TS 23.402 the contents of which are incorporated herein by reference.

Figure 5A:
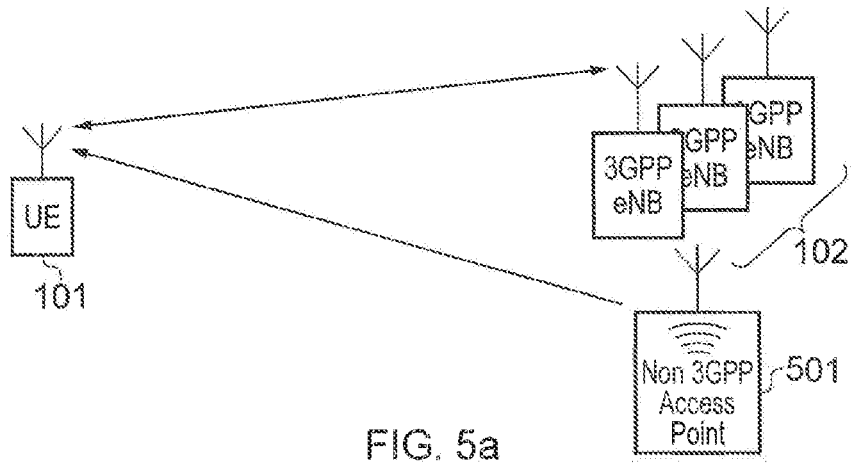
FIG. 5a is a schematic representation of operations performed by a communications terminal and infrastructure equipment according to a first part of an access point discovery process.
Figure 5B:
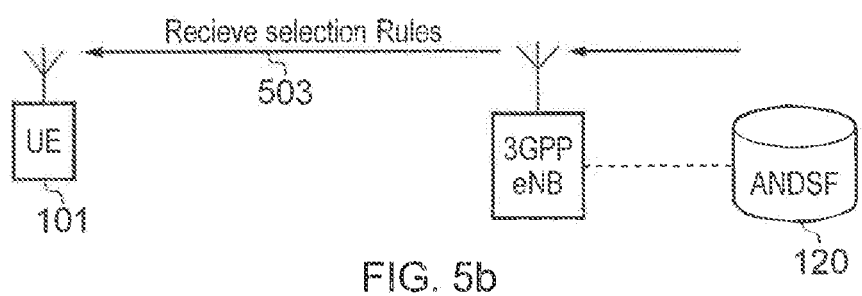
FIG. 5b is a schematic representation of operations performed by the communications terminal according to a second part of an access point discovery process, in which the communications terminal receives selection information from an ANDSF server.
Figure 5C:
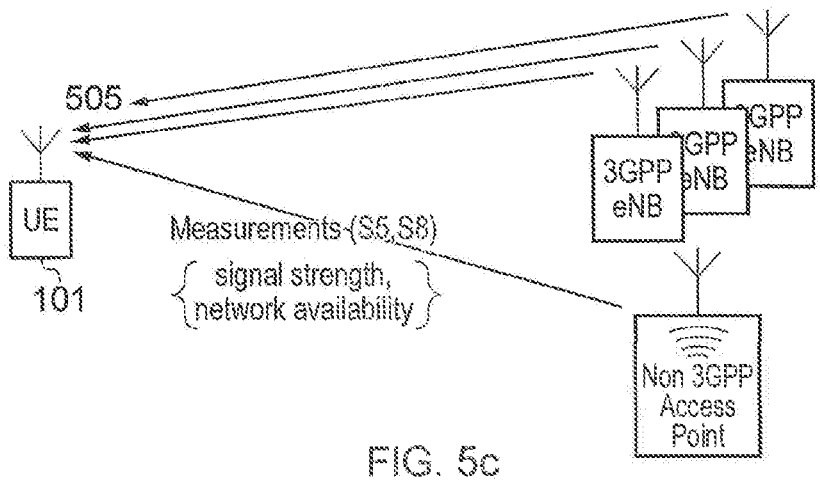
FIG. 5c is a schematic representation of operations performed by the communications terminal according to a third part of an access point discovery process, in which the communications terminal performs measurements of the networks which are available to it.
Figure 5D:
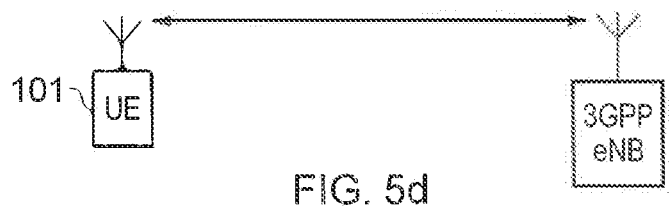
FIG. 5d is a schematic representation of operations performed by the communications terminal according to a fourth part of an access point discovery process, in which the communications terminal selects one of the available networks.

As a way of summarising the ANDSF discovery process presented in FIG. 4, a more pictorial presentation of the ANDSF discovery process shown in FIG. 4 is presented in FIGS. 5a, 5b, 5c and 5d. As shown in FIG. 5S, a communications terminal (UE) 101 first attaches to a mobile communications network, such as a 3GPP network, which may operate for example in accordance with LTE so that the UE 601 can perform an access network discovery using the ANDSF server 120. The UE 601 may also access other communications networks represented by the eNBs 102 or other wireless access points 501 may be available to the UE 601. As represented in FIG. 5b, the ANDSF server 120 communicates the rule representing selection information 503, which should be used by the UE 601 to select one of the 3GPP access networks or a non-3GPP access network. As represented in FIG. 5c, the UE 601 then evaluates the communications networks 102 and the access point 501 which are available to it, by measuring the signal strength of signals 505 received from the mobile communications networks or any of the access points which the UE 601 is able to receive. This aspect of the access network discovery, which is shown in FIG. 5c, corresponds to the process steps S5 and S8 of the signal flow diagram shown in FIG. 4. During this process, the UE 601 determines which of the mobile communications networks 102, 501 the UE should use to transmit or receive data according to the rule it has been provided by the ANDSF server 120 in combination with the measurements which it has performed. Finally as shown in FIG. 5d, the UE 601 communicates data using the mobile communications network 102 or the access point 501 which it has selected.

UE Directed Network Selection

Embodiments of the present technique can provide an arrangement in which a UE 601 selects an access network, whether this as a 3GPP access network or a non-3GPP access network, based on decision criteria and rules which are determined by the UE. In one example, the decision as to which access network the UE should use to communicate is determined by the UE in combination with information received from an ANDSF server. In some examples, the decision made by the UE as to which network to access may be made as a result of rules or information provided to the UE in combination with measurements conducted by the UE.

Figure 6A:
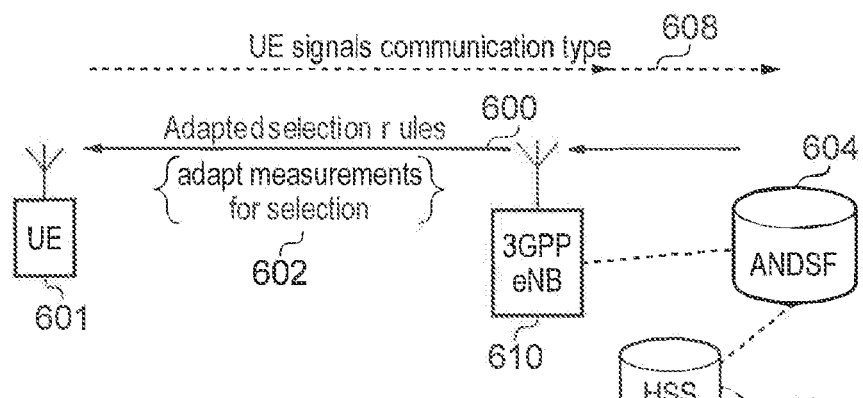
FIG. 6a is a schematic representation of operations performed by a communications terminal and infrastructure equipment according to an access point discovery process according to the present technique in which the communications terminal receives adapted selection information.
Figure 6B:
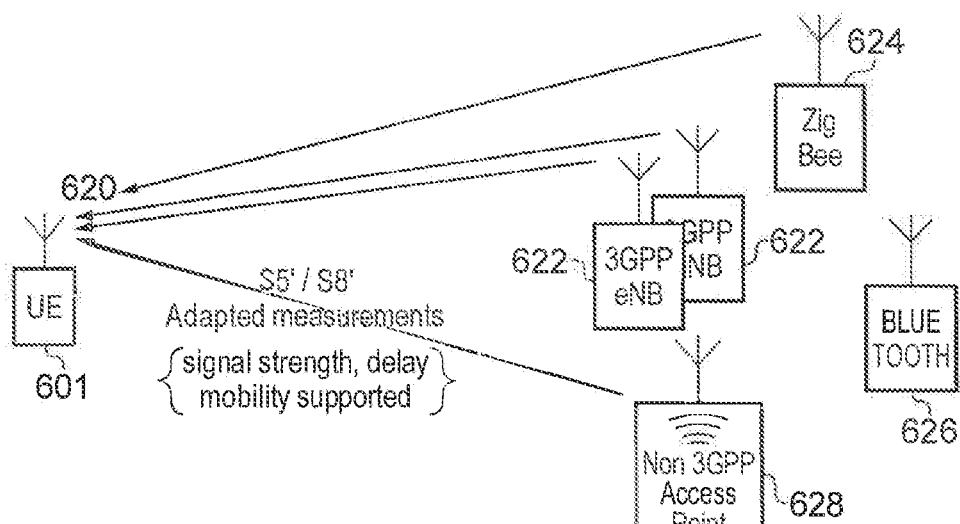
FIG. 6b is a schematic representation of operations performed by the communications terminal according to an access point discovery process according to the present technique, in which the communications terminal takes measurement of the wireless access networks which are available to it.
Figure 6C:
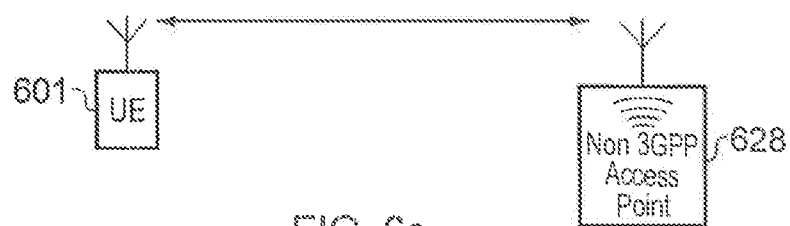
FIG. 6c is a schematic representation of operations performed by the communications terminal according to an access point discovery process according to the present technique, in which the communications terminal selects one of the available networks.

As a general illustration of the present technique, embodiments operate as illustrated in FIGS. 6a, 6b and 6c which correspond substantially to the illustration shown in FIGS. 5a, 5b, 5c and 5d, but adapted in accordance with an example embodiment. FIG. 6a provides an example illustration of an arrangement in which the UE 601 is arranged to receive an adapted rule or adapted rules in order to make a selection of a most appropriate network including adapted measurements for selecting the most appropriate network 602. In accordance with the present technique the ANDSF server 604 is arranged to receive an indication of a communications characteristic specifying the requirements for the signals which are to be communicated by the UE 601.

There are for example two ways in which the ANDSF server 604 could receive the indication of the communications characteristic which the UE 601 which is most appropriate for the UE according for example to its class or type. In a first example a home subscriber server 606 communicates with the ANDSF server 604 providing in advance an indication of the type of communication which the UE will be transmitting. Alternatively, the UE 601 could transmit signals indicating the communications characteristic which the UE 601 desires to the ANDSF server 608.

In accordance with a conventional operation as shown in FIG. 5a the UE 601 initially attaches to a mobile communications network via the base station 610 in order to access the ANDSF server 604. Thus in accordance with the conventional ANDSF discovery process shown in FIG. 5a the UE 601 receives the rule selection. However in accordance with the present technique, the rule or rules 600) received by the UE 601 are adapted in accordance with the communications characteristic which the UE 601 desires and correspondingly there is also an adaptation of the measurements which the UE performs in order to make the selection which are provided in the adapted measurements indication 602.

FIG. 6h illustrates an arrangement in which the UE 601 adapts the measurements which it performs. The measurements 620 are adapted in accordance with the type of communication which a UE 601 is to perform. An example of adapted measurements which the UE 601 could perform include signal strength, if the UE is to receive the best signal quality, but the measurements may also include determining a delay which the network may incur when transmitting or receiving data. Other examples of the measurements which the UE 601 may make include whether mobility is supported by the communications network and the extent to which mobility is allowed and a rate at which data can be communicated by the respective communications networks. Thus as shown in FIG. 6b the adapted measurements performed with respect to the signals 620 which are received from respective networks might include a 3GPP network including two different base nations or eNBs 622 from different 3GPP networks as well as other types of communications networks and access points for example front a Zigbee transmitter/receiver 624, a Bluetooth transmitter receiver 626 or non-3GPP access point such as Wi-Fi 628. Accordingly, the UE 601 can measure these signals in accordance with adapted measurements signalled by the ANDSF server, or the adapted measurements could be pre-configured into the UE 601. The UE 601 then makes a selection based on the adapted rules for selecting an appropriate network and the adapted measurements.

Finally in FIG. 6c, the UE 601 selects one of the networks or access points and communicates via that network for example the non-3GPP access point 628.

Further example embodiments are described in the following paragraphs in which the adapted measurements are performed by the UE, which are either signalled to it by the ANDSF server or they may be pre-specified and pre-encoded into the UE. Then according to the adapted selection rules provided by the ANDSF server 604, the UE performs measurements and then makes the selection adapted in accordance with the type of communications characteristic which the UE is to perform.

Figure 7:
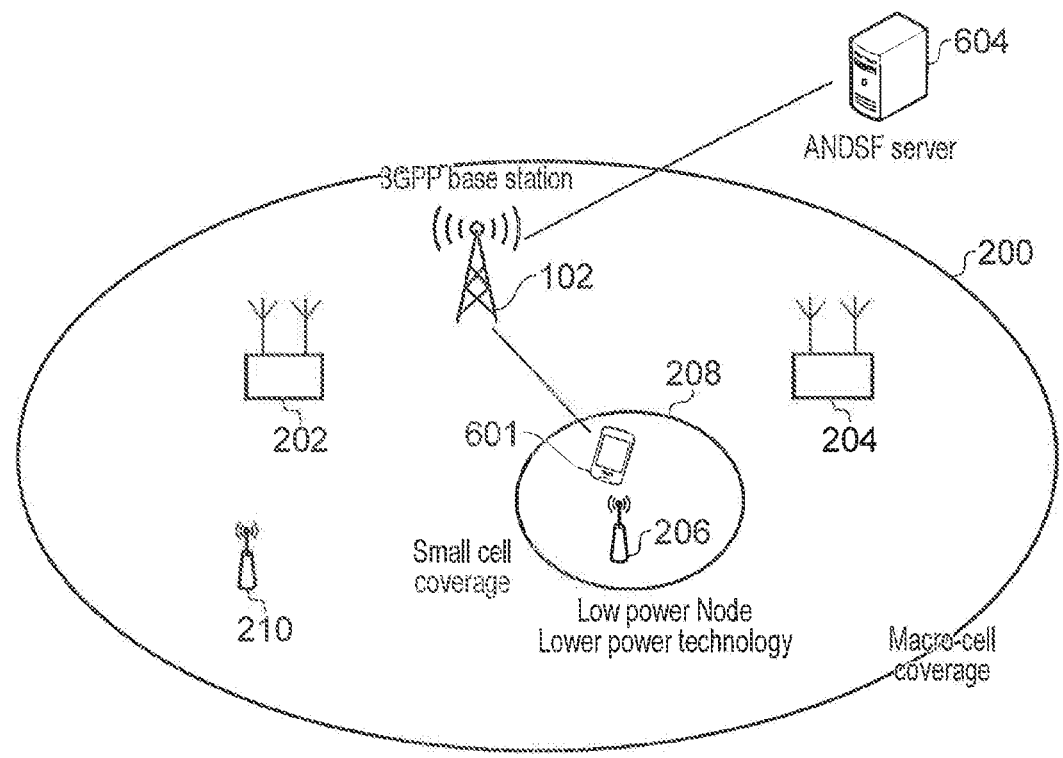
FIG. 7 is a schematic block diagram illustrating an example in which a communications terminal (UE) can communicate via different types of mobile communications networks and selects a most appropriate communications network according to its requirements.

An example scenario in which the UE may select a network to access in dependence upon decision criteria performed by the UE is shown in FIG. 7. As shown in FIG. 7, a base station 102 which would correspond to a base station providing a wireless access interface in accordance with a 3GPP access is connected to an ANDSF server 604. It will be appreciated that the diagram shown in FIG. 7 has been simplified to illustrate a process of the UE 601 acquiring an access network in accordance with a determination made by the UE from rules or measurement that it makes. The base station 102 provides a 3GPP wireless access network and therefore forms a macro-cell coverage 200. Also available to the UE 601 are shorter range and therefore lower power wireless access interfaces, such as, WiFi connections from WiFi access gateways 202, 204, 206. The WiFi connections provide a shorter range and therefore smaller coverage area 208. Correspondingly there may be other wireless access interfaces available to the UE 601 via transmitters or base stations 210 providing a shorter range communication. Therefore. FIG. 7 illustrates an example in which the UE 601 has access to a 3GPP access network via a macro cell 200 and also non-3GPP access networks via shorter range communications such as the WiFi wireless access gateways 202, 204, 206 and another example protocol such as Bluetooth, Zigbee or other wireless access interfaces 210.

Figure 8:
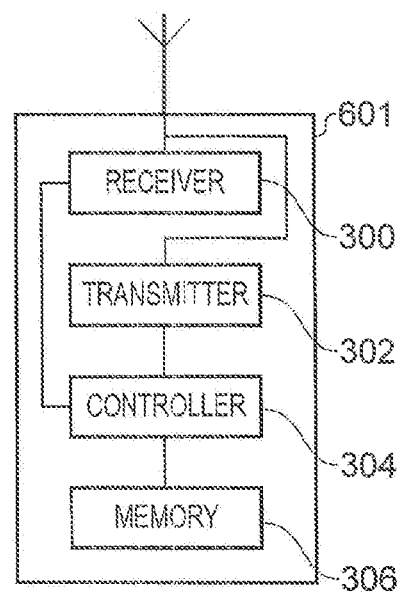
FIG. 8 is a simplified schematic block diagram of a communications terminal (UE).

FIG. 8 shows a simplified representation of the UE 601 which operates in the example shown in FIG. 7 to access one of the non-3GPP access networks or the 3GPP access network which are also represented in FIGS. 6 and 7. As shown in FIG. 8, the UE 601 comprises a receiver 300, a transmitter 302 which are controlled by a controller 304 which has access to a memory 306.

In accordance with the present technique the UE 601 determines which network to access based on decision criteria determined by the controller 304. The memory 306 may provide the controller 304 with rules which should be followed to determine which access network the UE should attach to and communicate through. In one example the receiver 302 can provide the controller 304 with information relating to the availability of access networks and the signal strength of available access networks. The transmitter and receiver may operate in accordance with a conventional arrangement to access different wireless access interfaces such as the 3GPP wireless access interface or a non-3GPP wireless access interface.

In the following examples in which the UE 601 chooses which access network to use to communicate data in accordance with different communications characteristics, which may be based on the type of the UE, which thereby provide decision criteria such as a selection tariff, power saving or mobility functions for example. In FIG. 7 for example the UE 601 may determine which access network to use in order to minimise a power consumed by the UE 601. This example may be particularly applicable to a simplified UE such as that optimised for machine type communications (MTC). To this end, additional information may be provided from the ANDSF to determine a policy followed by the UE 601. In some examples a plurality of different rules or decision criteria may be provided by the ANDSF 604, which define the communications characteristics which are used by the UE 601 to select the most appropriate access point. For example, the UE 601 may receive a rule from the home network and visitor network if UE is roaming such as the example illustrated in FIG. 3. Accordingly the UE 601 may select the suitable rule depending on its current situation. In some examples the UE 601 may combine different criteria to make a determined policy. The UE may decide the cell/access point selection policy based on the rules and its current situation such as its receiving conditions, the power available to it or the current state of the network.

Minimizing UE Power Consumption

As a first example, the UE is provided with a policy, according to which the first priority for UE is lower power consumption. Therefore in this example the communications characteristics provided to the ANDSF server 604 is an indication that the UE should access a network which requires the lowest power consumption. This might be an indication that the UE is an MTC type device. The rule which may include measurements which the UE is to perform are provided from the ANDSF server 604. The rule and the measurements therefore include provision for selecting the access network to achieve the lowest power consumed by the UE. Accordingly the UE selects a cells or access point in order to minimize the UE power consumption. The strategy of low power consumption may include selecting low power technology, a smaller path-loss cell, an increased stand-by time (long DRX) and so on. This information is therefore provided to the UE or included in the memory 306, which is accessed by the controller 304 to implement the rule. The rule may therefore include the following information:

Non-3GPP technologies case
  Information on Low power radio access technologies (e.g. ZigBee operation), so that the UE 601 performs measurements to detect the type of wireless access interface;

HSPA/LTE Case
  A likely Uplink transmission power consumption for access networks which operate in accordance with 3GPP, and for the available 3GPP access networks, to detect;
  Small uplink pathloss cells
    Small cell
    Uplink relay
  Whether the 3GPP is implemented to provide long standby power consumption related information;
    Whether a Super long DRX support cell/network For the example illustrated in FIG. 7, the UE may perform the following operations to select a communications network (3GPP or non-3GPP) based on the communications characteristic to minimize the power consumption:

1. The UE attaches to a communications network and accesses the ANDSF server 604. The ANDSF server 604 is provided with an indication that the UE has a preferred communications characteristic such that the UE is a low power UE and therefore should preferably be attached to a network which causes the least power consumption.
2. The UE detects a macro cell coverage (or something zone like Tracking Area) provided b the base station 102.
3. Then the UE sends the location/cell ID of the cell provided by the base station 102 to the ANDSF Server 120 via the macro-cell 200 (or via any other radio).
4. The ANDSF server 604 generates the ANDSF rule according to current UE position/zone.
5. The ANDSF server 604 sends the rule to UE via macro cell (or via any other radio) 200.
6. The UE 601601 receives ANDSF rule(s) from ANDSF server(s) 604.
7. The UE 601 performs measurements to determine the access points and communications networks which are available from its current location.
8. The UE 601 may receive assistance information from the base station 102 within the Macro-cell 200. (e.g. interference, LTE DRX cycle)
9. The UE 601 decides which cell/access point is the best/better in terms of power consumption in accordance with the rule it has received from the ANDSF server 604. (UE based selection, See detail selection algorithm later)
10. The UE 601 searches for suitable cell/access point according to policy.
11. The UE 601 connects to the cell/access point if UE 601 find (if not, UE continues to search second selected one)
12. The UE 601 can than establish via connected cell/access point.

If the UE 601 is in a fixed position, such as an example like an MTC application, for example a smart meter, some procedures could be omitted from the above steps above. For example, the UE 601 position/zone is preconfigured, and/or ANDSF rule is pre-configured in the UE as a default setting Network/Server Based Selection Alternatively, the ANDSF server 120 or LTE/SAE network, or a combination of the ANDSF server 120 and the network may select the cell/access point instead of UE-based selection. For example, the UE sends the measurement results to the ANDSF server 604 regarding small cells/access points and then the network selects the best cell/access point in terms of a power which the UE 601 must consume when communicating via this network with the latest information which the network has a knowledge (e.g. interference).

In another embodiment, the ANDSF server 120 may select the cell, which swill require the least power to be consumed by the UE, based in part or in combination with the measurement results taken by the UE and the latest information collected from network. Accordingly the selection algorithm performed by the UE (or network/server) to select the suitable cell/access point in terms of UE power consumption may be as follows.

The UE may make a selection of the cell/access point to reduce in accordance with a shortest transmission distance. This is because generally path-loss between UE and cell/access point is key factor for uplink power consumption as a result of a transmission power consumed by the UE. Accordingly, a smaller loss/shorter distance is better for uplink power consumption. The UE may therefore select the access point/cell based on the following priority:

$1^{st}$, Short Range communication (ZigBee, Bluetooth)
$2^{nd}$, Low power node, (small cell, relay)
$3^{rd}$, WiFi, pico-cell (3GPP)
$4^{th}$, Macro cell (LTE/W-CDMA)

Stand-by time is essential for power saving if UE is not so active in uplink transmission $1^{st}$, ZigBee (very low power sleep mode)
$2^{nd}$, LTE with long discontinuous receive (DRX) cycle (Longer is better for stand-by time)
$3^{rd}$, Wifi (It seems not good at sleep mode/stand-by mode)

The controller 304 in the UE 601 (or the ANDSF server 604) may record information representing an amount of data communicated with respect to time. Accordingly, the UE 601 can establish a pattern of communications resources used and to provide a history of a traffic pattern. The controller 304 can therefore make a decision as to which access point/cell to communicate via based upon the UE's traffic profile. For example, if the UE stays inactive longer, the power consumption in stand-by time is prioritized. If the UE transmits uplink traffic more often, the uplink power consumption is prioritized.

Improved Coverage for the UE

According to another embodiment of the present technique, the UE 601 determines the access point/cell based upon a coverage improvement. In previously proposed arrangement the ANDSF server 604 is the cell/access point accessed by the UE. i.e. which cell/access point exists near the UE. The actual coverage size varies depending on cell/access point and type of radio access technology (RAT).

According to this example embodiment, the UE may select the access/point/cell in accordance with the following priority:

Non-3GPP technologies are preferred because these can provide a greater bandwidth;
    Availability of hot spot access points/indoor access point
    LTE communications networks
    Transmission power required to access a nearest 3GPP network;
        Downlink (normal) transmission power
    Frequency-coverage information
        Coverage information in carrier aggregation
        RRH frequency
    Availability of coverage improvement techniques
        Availability of power boost (power headroom)
        Support of TI bundling
    Availability of relay nodes
        Relay nodes location/operation As will be appreciated in some examples the UE may combine a rule which prioritises the uplink coverage for the selection of the access point/cell with a rule which aims to reduce uplink power transmission. In some examples access point/cell selection for a shorter path-loss is commonly preferable.

In general, the substitute information may be used in line with a specific selection strategy as outlined above. For example, the availability of a power boost is likely to be changed dynamically. Therefore a congested cell list, which is statically defined in advance) or narrow band operation cell list, which is based on the hardware/software capability could be used. This information could be changed dynamically or it may be semi-persistent unless the replacement/software version update is performed.

A highly frequent information update is not suitable for ANDSF because this information is exchanged at the application layer. This means that a static or semi-static characteristic is preferable for ANDSF rule compared to a dynamic one. It there is a correlation between dynamic one and static one, then the static rule could be used. In that case, the information/measurement which indirectly shows the degree for specific purpose could be replaced with that in the embodiment in line with selection strategy.

If some parameter, which are required to implement a specific strategy, are not easy to measure in terms of UE complexity/battery consumption, then it is envisaged that substitute parameter/information can be used which has relation/correlation with original parameter within selection strategy. This substituted information could be applied correspondingly to other embodiments.

Selection to Reduce Delay Critical/Low Latency Traffic

According to another example embodiment a rule is determined by the controller 304 from information provided from the memory 306i which selects an access point/cell to minimize a delay for real time traffic/emergency communication. In some examples of MTC applications a UE may communicate data which is generally delay tolerant type traffic. However, some other example applications such as online gaming require that data be communicated with low latency. A conventional ANDSF server does not include information, which would allow an access point/cell is selected based on a tolerance of the data to be communicated to delay. In some examples a strategy to perform non-delay tolerant/delay tolerant cell selection is achieve by including information within the memory 306 of the UE 601 based on the type of network in which the data is being communicated. In general, the macro cell which has ideal (low delay) backhaul is preferable for non-delay tolerant communication, however the capacity is limited. If the traffic is delay tolerant, a non-Macro cell (e.g. small cell) should be selected in terms of radio resource usage, such as a WiFi network rather than an LTE network or cellular mobile communications network.

According to an example embodiment therefore an access point/cell may be selected in accordance with the following information:

Non-3GPP technologies case
    Delay tolerant network (e.g. mesh network)
LTE/W-CDMA Case
    Delay by traffic congestion
        Congestion in eNodeB scheduler
    Backhaul delay
        non-ideal backhaul for small cell
        RRH with ideal backhaul In general, delay is not so easy to indicate or predict as a cell specific delay by parameter(s) in advance, because the causes of delay are various and some of them are time variant like traffic load. However, simple parameterization is required for ANDSF because the rule should be prepared in advance, Thus, this embodiment can identify the static characteristic like the type of backhaul instead of actual delay value. This makes it easier to prepare the rule in the ANDSF server.

High/Low Speed Mobility Support

According to some embodiments the access point/cell may be selected in order to match a mobility requirement of the UE 601 to an ability of the network to support that network. For example the network may be selected in order to support high speed mobility. For example, in general, LTE macro cell supports high mobility. Therefore if the UE needs high mobility, macro cell should be selected. Furthermore other access points such as WiFi do not include any handover functionality and so would be preferred for low mobility or static communications devices. Some radio access technologies for example provide support for only low mobility/non-seamless handover support such as Wifi, which has small cell coverage. However some applications may require seamless handover.

In order to avoid too frequent handover, above factors should be taken into account:
 Mobility support in radio access technology
 High speed Mobility support
 Seamless handover support
 Paging support
 Coverage of cell/access point
 Coverage area/location per carrier
 Continuity of coverage by Neighbour cells
 Session time in application
 Average session/communication time in the application With regard to the coverage provided by a particular cell, a conventional LTE network does not include detailed coverage information on neighbouring cells. Accordingly, the network just informs the UE of a white list (the preferable cells to use) and a black list (prohibited cells to use). However, in a real network, the coverage is not always continuous depending on carrier and/or bandwidth, for example for the LTE carrier aggregation operation case. On the contrary, there is little disadvantage of discontinuous coverage for stationary UEs. Thus, in this embodiment, the network determines how the coverage is formed, for example, whether its continuous or discontinuous in a certain area wide enough for high mobility UE. For example, the wide area includes the neighbour of a neighbour's cells. As a result, a high mobility (fast moving) UE can enjoy the continuous coverage and this reduces the handover failure and/or unnecessary inter-frequency handover.

As will be appreciated this mobility related information may also be used for UE power consumption reduction. For example, it the UE has low mobility, the cell/access point which the UE needs to discover could be reduced. In one example, the UE can save the power consumption to find/search the cell/access point if candidate cell/access point is narrowed down.

Minimizing the Communication Cost

According to another example rule which may be provided to the UE, the controller 304 may select an access point in older to reduce the communication cost for the network or the UE. According to this example embodiment a mobile operator may apply different pricing rules or a pricing tariff for certain types of UEs, for example those operating in MTC/M2M type applications in comparison to users of conventional mobile phone/smart phone. For example, a non-linear cost versus traffic rule may be applied, such as a kind of volume discount. Accordingly, if the cost of communicating set by the operator of an LTE network changes dynamically with demand and supply, the UE may select the access point/cell which offers the lowest cost. According to this example, the rule may include following information:
 Free of charge access point info
 Free Public WiFi
 User's private network
 Mobile operator cost info
 LTE/HSPA communication Tariff
 Temporary/seasonal discount information
 Congestion information (if demand dependency price)
 Non-3GPP operator info
 Non-3GPP M2M operator's service availability
 Communication cost/tariff Tariff Based Selection Procedure According to this example embodiment, the UE receives information representing a communications tariff from ADNSF servers. The UE then judges the best price network based on its own requirements of the communications network and given tariffs from servers.

Figure 9:
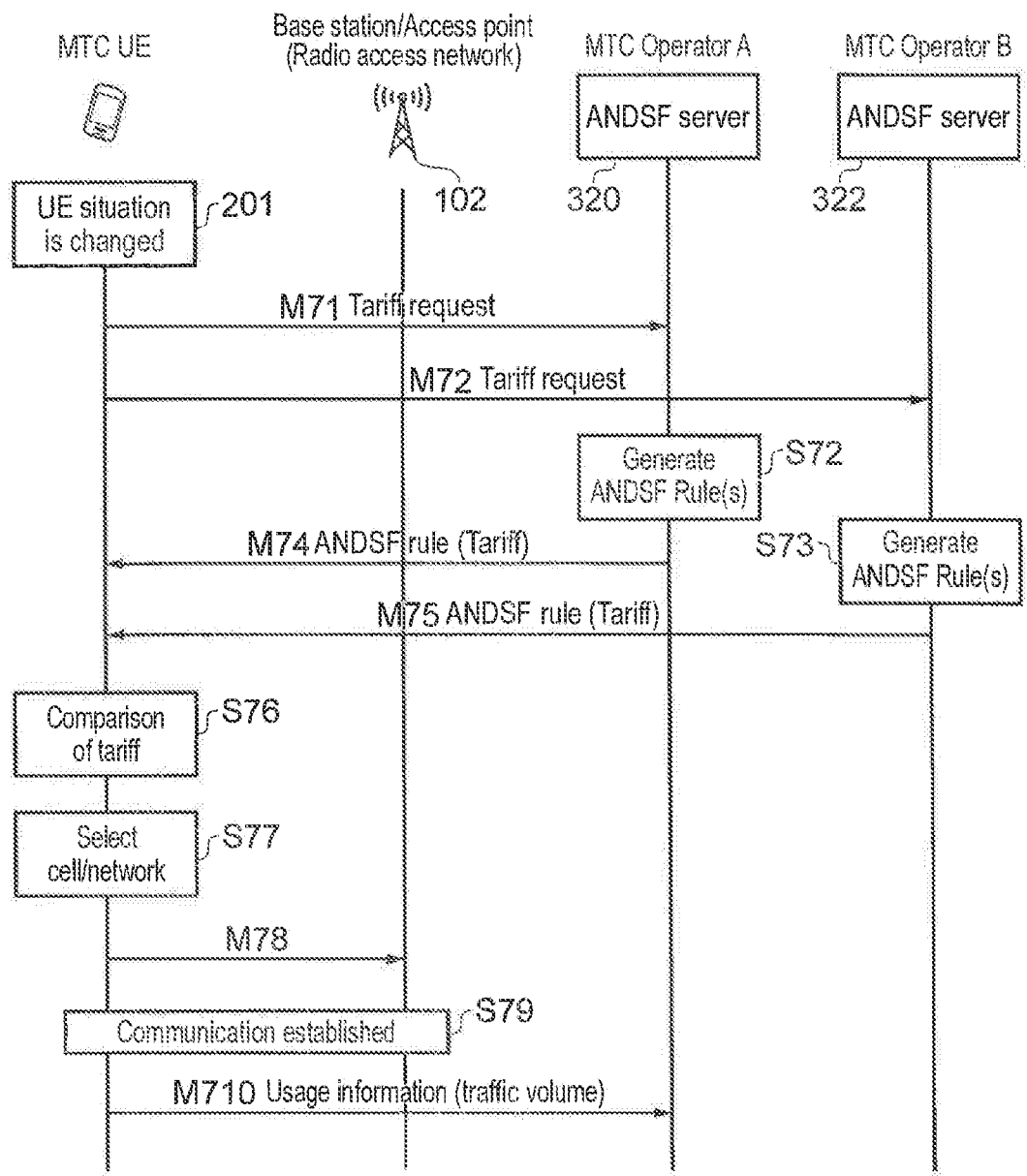
FIG. 9 is a message flow diagram illustrating a process flow in which a communications terminal (UE) receives information from an ANDSF server and selects an appropriate communications network based on a tariff provided by operators of communications networks.

FIG. 9 provides an example call flow diagram of the implementation according to this embodiment in which the UE 601 selects the access network from a choice of two access networks based on tariff information provided by each of the different access networks. As shown in FIG. 9 a communications device such as an MTC UE 601 which has been adapted in accordance with the present technique is arranged to attach to a base station or wireless access point 102. The UE transmits a tariff request message to each of two ANDSF servers 320, 322 which are operated by a first operator A and a second operator B respectively. Thus each of the different operators A and B may provide access to their respective wireless access networks in accordance with a different payment tariff. Accordingly, the tariff request messages N71, N72 which are transmitted to respective ANDSF servers 320, 322 request an indication from the ANDSF server of the tariff which is being enforced by the respective operators. In step S72 and S73 each of the respective ANDSF servers 320, 322 generate ANDSF rules for accessing the respective access networks and transmit an ANDSF rule tariff via messages M74, M75 to the UE 601.

In step S76 the UE compares the respective tariffs received in the messages providing the tariffs N74. N75 and determines which access network the UE should attach. Accordingly in step S77 the UE selects one of the access networks and transmits via the base station 102 the message M78, establishing communications via the selected wireless access network which in the present example is the operator A via the ANDSF server 320. Thus in step S79 communication is established between the UE and the access network in accordance with a conventional operation. In message M710 the UE transmits a usage message to the ANDSF server 320 of the operator A to indicate that it will be communicating via the access network operated by the operator A and may indicate the amount of data which is to be communicated via that access network.

Figure 10:
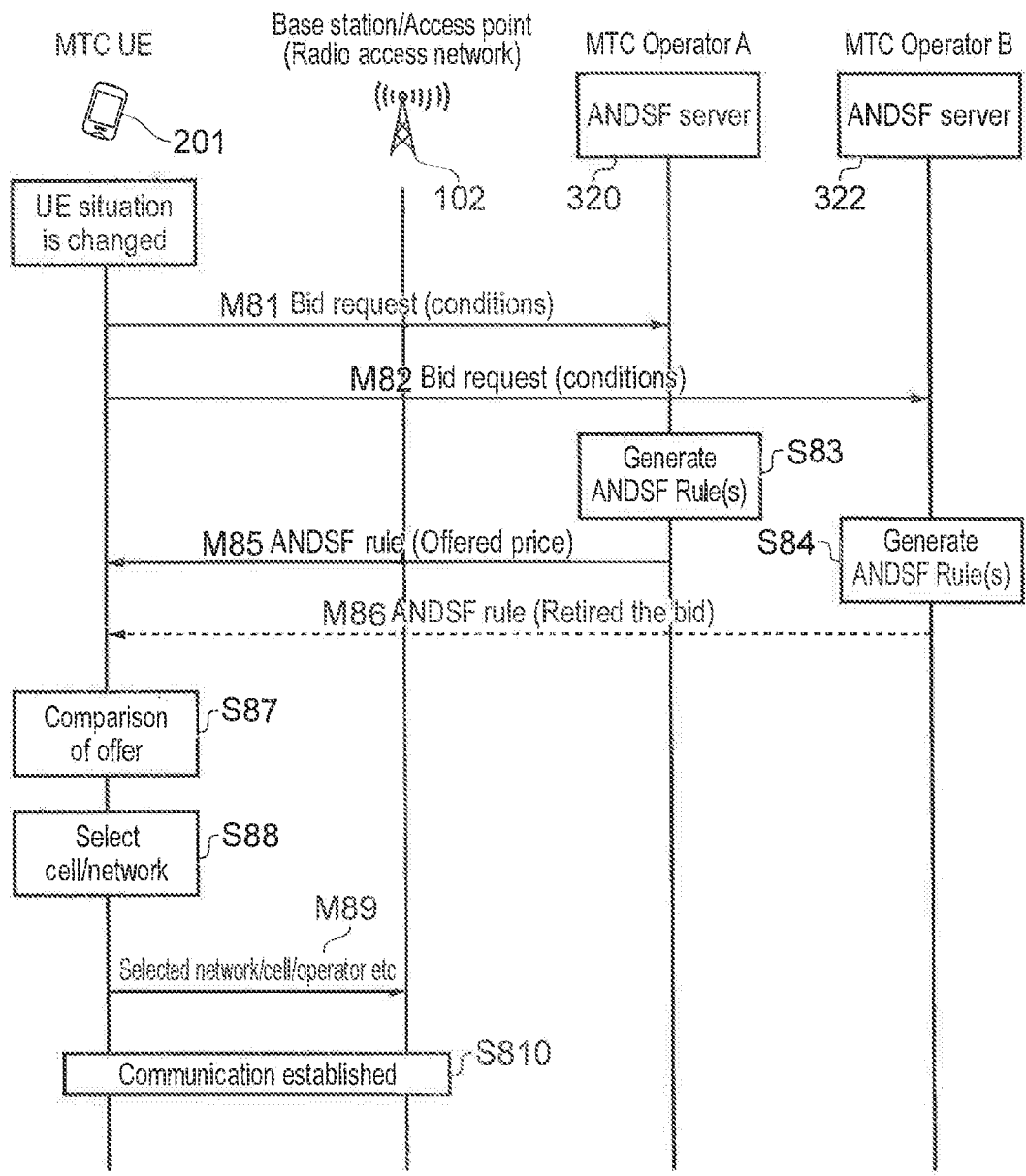
FIG. 10 is a message flow diagram illustrating a process in which a communications terminal (UE) receives information from different ANDSF servers which are attached to different communications networks and receives an indication of cost for communicating data via the different communications networks in accordance with a request from the communications terminal.

Bid-Based Selection Procedure In a further example embodiment of the present technique the UE 601 is arranged to determine which of the access networks it will use to transmit and/or receive data based on a bidding process. FIG. 10 provides an example call flow diagram which corresponds to the call flow diagram shown in FIG. 9 and so only the differences will be explained. As shown in FIG. 10 an MTC. UE 601 is adapted in accordance with the present technique to transmit a bid request message M81, M82 to each of the respective ANDSF servers 320, 322 which are controlled b % the different operators of respective wireless access networks. The UE may determine its current communication requirements, which may include its location, traffic buffer status etc. The bid request messages may include requested conditions for using the different accessed networks controlled by the ANDSF servers 320, 322, which may include for example the UE's location, cell, access point, possible traffic volume, time/hour in which communication is required and QoS requirements.

In step S83 and S94, the respective ANDSF servers 320, 322 transmit the ANDSF rules. In the first example the ANDSF server 320 generates an ANDSF rule in step S83 and transmits message M85 to the UE providing the ANDSF rule which includes an offer price for carrying data for the UE 601 for a particular price. Similarly the second ANDSF server 322 controlled by an operator B generates the ANDSF rule in step S84 and transmits via message M86 the ANDSF rule in response to the request for bid information from the UE 601. In steps S87 and S88 the UE compares the offered conditions for communicating from the respective operators A and B and then selects the network which it will use to transmit data or receive data. The UE 601 then transmits a message M89 to the access network via the base station 102 to which it will attach. Thus in step S810 communication is established with the preferred access network.

Conventionally, tariffs for communicating data offered by an operator are not so flexible and typically are fixed. However, these example embodiments may provide flexible pricing depending on demand/supply and available capacity. However this example embodiment can provide the UE with the possibility to access the best pricing for the communications resources which is needs.

Assistance Information from 3GPP Network in Addition to ANDSF Rule

Conventional an ANDSF server 604 is not suitable for frequent information/rule updates to be performed between UE and ANDSF server 604. If the rule is exchanged via 3G/4G network, an EPS bearer establishment is required. A frequency of information exchange may in itself cause high network load. This has less meaning for network off-loading. In general, the ANDSF rule should be static/semi-static and is not assumed to reflect latest network situation.

For an example application in which the UE is a reduced capability device such as for example an MTC type device, depending on an availability of LTE radio resources, the MTC UE could enjoy some additional improvement which are suitable for an MTC type device, such as an improved coverage or low cost communication when communications resource are available due to low traffic. Therefore, some information may be provided to UE from a radio access network (RAN) part of a communications network RAN directly, rather than from ANDSF sever. Alternatively, the ANDSF server may receive some information from the RAN directly not from UE.

At latest phase (3GPP TSG-RAN WG2 Meeting #82, Fukuoka, Japan, 20-24 May 2013), 3GPP considered introducing the network load measurement (e.g. WLAN RSSI, LTE RSRQ) and the threshold (which is the load level to handover trigger) into RAN level signalling on top of ANDSF. However, according to some example embodiments of the present technique, some information which may be provided to a UE in order to make a decision as to which network to access. Examples of such additional assistance information, which may be communicated to the UE from the RAN may include radio resource availability as indicated by network. This may include:
  LTE radio resource availability
  Availability of coverage improvement techniques
    Availability of power boost (power headroom)
    Support of TTI bundling This information may broadcast with system information block (SIB) or MBMS of an LTE configured network.

Examples of assistance information which may be transmitted from the RAN to the ANDSF server may require some judgement to be performed by the ANDSF server. This may include the latest radio resource information, which may be transferred to the ANDSF server from RAN nodes. This communication of the assistance information may not consume radio resources. This assistance information may include:
  Availability of RAN resources
  Power headroom of eNodeB
  Uplink interferences
  The number of connected UE
    RAN level: RRC connected UE
    CN level; Attached UE (EMM registered)
  History information
  The history of traffic pattern/radio resource consumption This information may be collected with S1 signalling and communicated via S-GW/P-GW to the ANDSF server.

Procedure/Message Sequence Between Nodes

According to this example embodiment the following examples of equipment are required to configure and to implement this example embodiment:
  UE (terminal): Typically, the UE has more than one radio access technologies, such as LTE, Wi-Fi. However, in some examples the UE may only have one radio access network, but can still be arranged to implement one of the example embodiments in which an access point/cell can be selected/handover made between an LTE macro cell and LTE small cell. The UE may have a function for inputting a user preference, which can be used by the end-user to write the preference of handover/selection into a flash ROM or can pre-configure the preference in the SIM-Card.
  Base station/Access point (Radio Access): Typically, this is an access point/base station such as LTE, eNodeB, HSPA NodeB and Wi-Fi Access point. However, example embodiments can be implemented with a low power communication system like ZigBee, ad-hoc network. This also includes the backhaul line from radio access point.
  IP transport network (Core network): This can be a general core network function. One example is 3GPP EPC (Evolve Packet Core) or general IP network like Internet.
  Server (Application): This is a server which acts to provide ANDSF functions. Typically, the server is located in the application layer and has the function of OMA-DM (Open Mobile Alliance-Device Management. In terms of physical location, it may be co-located with other nodes like PDN-Gateway or independent node.
  Home subscriber server (subscriber information database): Subscriber/User information is stored in the server. The examples of stored data are user identifier (IMSI), Tracking Area/Location Area in UE (for paging), service contract information like charging plan.

Figure 11:
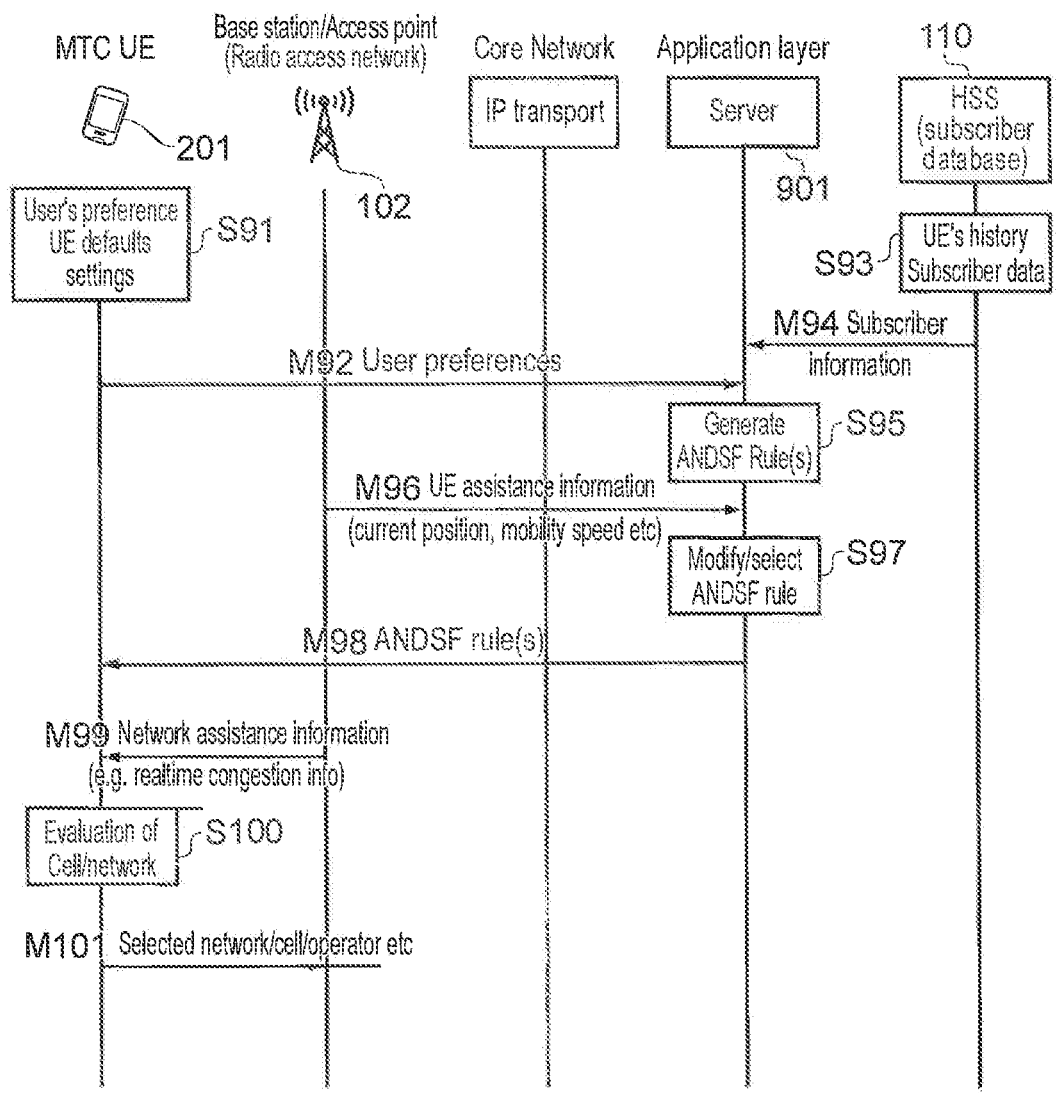
FIG. 11 is a message flow diagram illustrating a process in which a communications terminal (UE) receives additional information provided by an ANDSF server which itself is provided with an indication of a current status of a radio access network part of different communications networks.

A further example embodiment of the present technique will now be described with reference to FIG. 11 which illustrates a process in which a UE acquires information in order to make the selection of a particular cell in accordance with predetermined criteria. As shown in FIG. 11 a UE 601 is arranged in step S91 to receive a default settings and preferences for selecting a particular cell. Then the UE communicates in message M9 the user preferences to an application server 901 via a base station 102, accordingly the UE sends the user preferences of cell/network and capabilities to application server 901. For example, the user preferences my include an indication that the UE is a smart meter, has low power communication, no mobility, access capability is LTE and ZigBee. Typically, this information is fixed or not so often changed.

Thus the UE 601 has attached to an access network for first accessing the application server 901 which maybe a 3GPP access network or maybe a non-3GPP wireless access point. In response an HSS 110 may also provide information such as history of the user activities and user preferences of previous selections, preferences, capabilities, location and operator contract to the application server 901.

In step S95 the application server 901 generates the rule for selecting the particular cell. Using a message M96 the UE or the base station 102 may transmit UE assistance information such a current position of the UE, a mobility speed, an amount of power available to the UE to the application layer server 901.

In step S97 the application server modifies the ANDSF rules which are to be used by the UE to select a particular access point/cell and/or a particular network. The radio access network may send additional information to assist the UE evaluation of the best access point/cell. These modified or selected rules are transmitted to the UE via a message M98. In a message M99 the base station may also transmit network assistance information indicating a current state of network traffic, for example, congestion or whether the UE should use a particular carrier, cell congestion status, power boost information (remaining power at the eNode B) and/or network. In step S100 the UE evaluates the information received from the network and the ANDSF rules received in message M98 in order to select a particular network, an access/point/cell or an operator. The UE then transmits a message M101 to the base station 102 thereby selecting which access network the UE will use.

Example embodiments of the present technique can provide advantages as a result of providing additional information (MO: managed object) in the selection rule Delay critical application
Coverage imbalance solution (small uplink pathloss)
Effective use of un-used radio resources
Communication cost reduction Providing additional assistance information can provide the following advantages:

Quick reflection of the latest network status to UE selection policy
Reduction of the radio network load and signalling.

SUMMARY

Embodiments of the present technique can be arranged to provide data communication in accordance with a communications characteristic specified by the UE, which can take MTC specific factors like the type of application and its requirements into account. For example, in conventional LTE, the policy based on ANDSF rile(s) promotes UE to select/handover to non-3GPP network when the UE is in the area where LTE cell is likely to be congested. Accordingly embodiments of the present technique can provide a policy based on ANDSF rule(s) which promotes UE to select/ handover of a suitable cell/network/operator for specific MTC requirements/User preferences according to the information in the rule. For example, the rule prioritizes the delay critical/low latency; the UE receives the information of delay for cell/network/operator and selects/handover the suitable cell (smaller delay). The UE then receives the same radio access (e.g. LTE macro cell which has large delay backhaul/Small cell which has small delay backhaul), the cell selection/handover is induced.

Conventional Operation of the ANDSF Server

A conventional operation of an ANDSF server which provides a rule to the UE is configured with the ANDSF MO (Managed Object in 3GPP TS 24.312 V10.5.0). The conventional ANDSF has following information:

Radio access (WiFi, Wimax, LTE etc)
priority network e.g. WLAN/LTE/WiMAX
Location/cell information
PLMN(operator network ID)
Area code(TAC/LAC/RAC)
Cell ID(LTE)
SS-ID(WLAN)
Applicable Time/date (in order to avoid busy hour)
TimeOfDay; start Time/Date and stop TimeDate Embodiments of the present technique combine a UE's location with related applications/requirements and user preferences to select the access point/cell. For example, if the MTC terminal is smart meter, high speed handover is less likely to occur. As a result, mobility related information should be optimized (omitted) in line with install MTC UE application. In addition, ANDSF server may collect supplemental information from RAN, especially if it is relatively dynamically changed. For example, ANDSF server receives the current UE moving speed from eNodeB and can customise the rule for UE.

Figure 12:
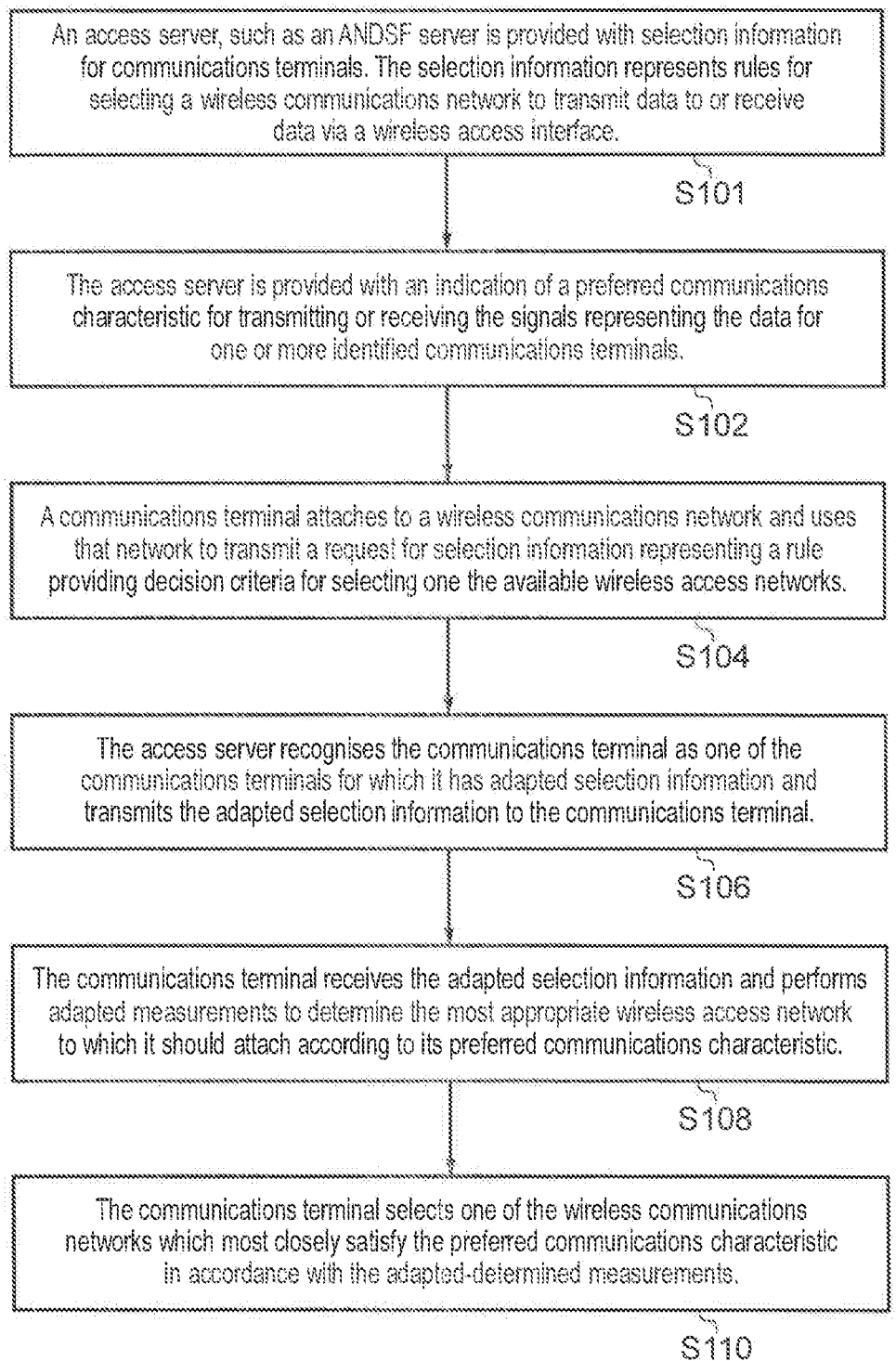
FIG. 12 is an illustrative flow diagram of the operations performed by communications terminal and infrastructure equipment according to the present technique.

Embodiments of the present technique operate generally in accordance with the flow diagram shown in FIG. 12, which is summarised as follows:

S101: An access server, such as an ANDSF server, is provided with selection information for communications terminals to select one of the wireless access networks which are available to it. The selection information represents rules for selecting one of the wireless communications network to transmit data to or receive data via a wireless access interface.

S102: An access server is provided with an indication of a preferred communications characteristic for transmitting or receiving the signals representing the data for one or more identified communications terminals. The preferred communications characteristic may be for example that the communications terminal is a type which requires a reduced power consumption, or will transmit delay tolerant data or has a low or no mobility. In some examples, the preferred communications characteristic may be implied from the type or class of the communications terminal such as whether it is an MTC type device.

S104: A communications terminal attaches to a wireless communications network and uses that network to transmit a request for selection information representing a rule providing decision criteria for selecting one the available wireless access networks.

S106: The access server recognises the communications terminal as one of the communications terminal for which it has adapted selection information and transmits the adapted selection information to the communications terminal.

S108: The communications terminal receives the adapted selection information and performs adapted measurements to determine the most appropriate wireless access network to which it should attach according to its preferred communications characteristic. The determined measurements may be an indication of a type of wireless access interface provided by a wireless communications network and/or a current status of the wireless communications networks to transmit or to receive data from the communications terminals.

S110. The communications terminal selects one for the wireless communications networks which most closely satisfy the preferred communications characteristic in accordance with the adapted-determined measurements. The communications terminal can select a most appropriate one of the wireless communications networks based upon, for example, the capability of the communications terminal, the application for which the communications terminal is being used and accordingly which of the wireless communications networks is most appropriate for the communications terminal.

The following numbered clauses provide further aspects and features of example embodiments:

1. A communications terminal, comprising
a transmitter configured to transmit signals representing data via a wireless access interface to an infrastructure equipment and a receiver configured to receive signals from the infrastructure equipment via the wireless access interface, the infrastructure equipment for forming a mobile communications network, and
a controller configured in combination with the transmitter and the receiver
to receive selection information representing a rule for selecting wireless communications networks to transmit data to or receive data from the wireless communications networks,
to determine one or more measurements of wireless access interfaces of the wireless communications networks to determine which of the wireless communications networks the communications terminal should use to transmit or receiver the data, and
to select one of the wireless communications networks for transmitting or receiving the data in accordance with the selection information in combination with the one or more determined measurements of the wireless access interfaces of the wireless communications networks, the access server being provided with an indication of a preferred communications characteristic for transmitting or receiving the signals representing the data, and receiver is configured
to receive from the access server adapted selection information providing an adapted rule for selecting the one of the wireless communications networks, and the controller is configured
to determine one or more adapted measurements of the wireless access interfaces in accordance with the preferred communications characteristic, and
to select one of the wireless communications networks which most closely satisfies the preferred communications characteristic in accordance with the adapted-determined measurements.

2. A communications terminal according to clause 1, wherein the controller is configured in combination with the transmitter
to transmit the preferred communications characteristic to the access server, and
to receive from the access server the adapted selection information communicated to the communications terminal.

3. A communications terminal according to clauses 1 or 2, wherein the preferred communications characteristic includes one of a minimum delay, an indication of a relative mobility of the communications terminal, an indication of a relative power which the communications terminal is to consume or an indication of an amount of bandwidth which is required by the communications terminal to communicate the data.

4. A communications terminal according to clause 1, wherein the preferred communications characteristic includes an indication of a type of the communications terminal which is to communicate via the first or the second communications networks.

5. A communications terminal according to clause 1, wherein the controller is configured in combination with the transmitter
to transmit one or more parameters to the access server, and the controller is configured to control the receiver
to receive from the access server the adapted selection information, the selection information being adapted by the access server in response to receiving the one or more parameters, the access server adapting the selection information in response to the received one or more parameters.

6. A communications terminal according to clause 5, wherein the one or more parameters transmitted to the access server include a relative location of the communications terminal, the access server being configured to adapt the selection information in accordance with the relative location of the communications terminal.

7. A communications terminal according to clause 6, wherein the selection information is adapted by the access server in accordance with the relative location of the communications terminal, by identifying that the communications terminal should be able to access one or more of the wireless communications networks from the relative location of the communications terminal.

8. A communications terminal according to clause 1, wherein the controller is configured to control the transmitter and the receiver
to attach to one of the wireless communications networks,
to request from the access server the selection information providing the indication of whether to transmit or to receive the data via the first or the second wireless access interfaces, and
to receive the adapted selection information from the access server via the wireless communications networks.

9. A communications terminal according to clause 1, wherein one of the determined measurements of the first and the second communications networks includes an indication of a radio access technology which is used to transmit the signals on the wireless access networks, and the controller is configured
to select one of the wireless communications networks to transmit and to receive the data in accordance with radio access technology which will minimise a power consumed by the communications terminal.

10. A communications terminal according to clause 1, wherein one of the determined measurements of the first and the second communications networks includes a stand-by time which the controller can adopt in a discontinuous reception or transmission mode, and the controller is configured
to select the first or the second communications networks to transmit and to receive signals in accordance with the type of transmission signals which will maximise the stand-by time.

11. A communications terminal according to clause 1, wherein the determined measurement includes a relative cost of communicating via the first and the second mobile communications network.

12. An access solver for providing selection information to communications terminals to attach to wireless communications networks, the access server comprising a receiver unit for receiving requests from the communications terminals for the selection information which provide rules for selecting one of the wireless communications networks via which the communications terminals should transmit data to or receive data from the wireless access network, a transmitter unit for transmitting the selection information to the communications terminals, and a controller fir controlling the transmitter unit and the receiver unit and configured to retrieve the selection information from a data store in response to a received request from a communications terminal and to transmit the retrieved selection information to the communications terminal, wherein the access server is provided for one or more of the communications terminals with an indication of a preferred communications characteristic for transmitting or receiving signals representing data, and the controller is configured in response to the receiver unit receiving a request for selection information from one of the one or more communications terminals, to adapt the selection information in dependence upon the preferred communications characteristic of the communications terminal, and to transmitted the adapted selection information to the communications terminal for selecting one of the wireless communications networks.

13. An access server according to clause 12, wherein the controller is configured in combination with the receiver unit to receive an indication of the preferred communications characteristic from the communications terminal.

14. An access server according to clause 12, wherein the access server is configured to receive an indication of the preferred communications characteristic of the communications terminal from a wireless communications network.

15. An access server according to clause 12, wherein the preferred communications characteristic includes one of a minimum delay, an indication of a relative mobility of the communications terminal, an indication of a relative power which the communications terminal is to consume or an indication of an amount of bandwidth which is required by the communications terminal to communicate the data.

16. An access server according to clause 12, wherein the preferred communications characteristic includes an indication of a type of the communications terminal which is to communicate via the first or the second communications networks.

17. An access server according to clause 12, wherein the receiver unit is configured to receive from communications terminal one or more parameters to the access server, and in response to receiving the one or more parameters from the communications terminal, the access server is configured to adapt the selection information, which is transmitted to the communications terminal for selecting the wireless communications networks.

18. A communications system for communicating data to and from a communications terminal, the communications system comprising a plurality of wireless communications networks arranged to transmit signals to and receive signals from the communications terminal via wireless access interfaces, an access server configured to provide selection information to communications terminals representing rules for selecting one of the wireless communications networks to transmit data to or receive data from the wireless communications network, and the communications terminal is configured to receive from the access server the selection information for selecting one of the wireless communications networks, which the communications terminal should access for transmitting or receiving the data, to determine one or more measurements of the wireless access interfaces of the wireless comminations networks, and to select one of the wireless communications networks for transmitting or receiving the data in accordance with the selection information in combination with the one or more determined measurements of the wireless access interface of the wireless communications networks, wherein the access server is provided with an indication of a preferred communications characteristic for transmitting or receiving the signals representing the data, and in dependence upon the preferred communications characteristic the access server is configured to adapt the selection information transmitted to the communications terminal for selecting the one of the wireless communications networks, and in accordance with the preferred communications characteristic the communications terminal is configured to adapt the determined measurements, and to select one of the wireless communications networks which most closely satisfy the preferred communications characteristic in accordance with the adapted-determined measurements.

19. A method of communicating data from a communications terminal to a wireless communications network or receiving data from the wireless communications network, the method comprising providing an access server, attached to a wireless communications network, with selection information for communications terminals, the selection information representing rules for selecting a wireless communications network to transmit data to or receive data from the wireless communications network via a wireless access interface, receiving at the communications terminal from the access server the selection information representing a rule for selecting the wireless communications network, which the communications terminal should access for transmitting or receiving the data, determining one or more measurements of wireless access interfaces of the mobile communications networks which are available to the communications terminal, and selecting one of the mobile communications networks for transmitting or receiving the data in accordance with the selection information in combination with the one or more determined measurements of the wireless access interface of the wireless communications networks, wherein the receiving at the communications terminal from the access server the selection information comprises providing the access server with an indication of a preferred communications characteristic for transmitting or receiving the signals representing the data, and in dependence upon the preferred communications characteristic the access server adapting the selection information transmitted to the communications terminal for selecting the wireless communications network, in accordance with the preferred communications characteristic, adapting the determined measurements, and selecting one of the communications networks which most closely satisfies the preferred communications characteristic in accordance with the adapted-determined measurements Various further aspects and features of the present invention are defined in the appended claims. It will appreciated that the example of LTE and terminology in respect of LTE has been provided for one example only and other access networks which are 3GPP or non-3GPP may be used.

There are many alternatives of information/measurement for specific selection strategy. If there is a correlation/relation between information in this embodiment and another one, this could be replaced in line with selection strategy.

The invention claimed is:

1. A communications terminal, comprising:
a transmitter configured to transmit signals via a wireless access interface to an infrastructure equipment for forming a mobile communications network;
a receiver configured to receive signals from the infrastructure equipment via the wireless access interface; and
a controller configured, in combination with the transmitter and the receiver, to receive selection information that represents a rule for selecting a wireless communications network, of a plurality of wireless communication network, in which to transmit or receive data;
determine one or more measurements of wireless access interfaces of the plurality of wireless communications networks to determine which wireless communications network the communications terminal should select to transmit or receive the data; and
select a first wireless communications network, of the plurality of wireless communications networks, in accordance with the selection information and the one or more measurements, wherein
one of the measurements of the wireless communications interfaces includes an indication of a radio access technology used to transmit the signals on the plurality of the wireless communication networks, and
the controller is configured to select the first wireless communications network and to transmit and receive the data in accordance with radio access technology which will minimize the power consumed by the communications terminal.

2. The communications terminal of claim 1, wherein
the controller is configured to control the transmitter and the receiver to attach to the first wireless communications network.

3. The communications terminal of claim 1, wherein
one of the measurements of the wireless communications interfaces includes a stand-by time which the controller adopts in a discontinuous reception or transmission mode, and
the controller is configured to select the first wireless communications network to transmit and receive signals in accordance with the type of transmission signals which will maximize the stand-by time.

4. The communications terminal of claim 1, wherein
the determined one or more measurements include a relative cost of communicating via the first wireless communications network.

5. The communications terminal of claim 1, wherein
when the receiver receives adapted selection information providing an adapted rule for selecting a wireless communications network, the controller is configured to
determine one or more adapted measurements of the wireless access interfaces in accordance with the adapted selection information; and
select a second wireless communications network, of the plurality of wireless communications network, which satisfies the adapted rule in accordance with the adapted-determined measurements.

6. The communications terminal of claim 5, wherein
the adapted rule corresponds to one or more of a minimum delay, an indication of a relative mobility of the communications terminal, an indication of a relative power which the communications terminal is to consume or an indication of an amount of bandwidth which is required by the communications terminal to communicate the data.

7. The communications terminal of claim 5, wherein
the controller is configured to control the transmitter to transmit one or more parameters to the first wireless communication network, and
the adapted selection information is generated based on the one or more parameters.

8. The communications terminal of claim 7, wherein
the one or more parameters transmitted to the first wireless network include a relative location of the communications terminal, and
the adapted selection information is generated in accordance with the relative location of the communications terminal.

9. The communications terminal of claim 8, wherein
the first wireless network is configured to generate the adapted selection information by identifying whether the communications terminal is able to access the first wireless communications network from the relative location of the communications terminal.

10. A communications terminal, comprising:
circuitry configured to
transmit signals via a wireless access interface to an infrastructure equipment for forming a mobile communications network;
receive signals from the infrastructure equipment via the wireless access interface;
receive selection information that represents a rule for selecting a wireless communications network, of a plurality of wireless communication networks, in which to transmit or receive data;
determine one or more measurements of wireless access interfaces of the plurality of wireless communications networks to determine which wireless communications network the communications terminal should select to transmit or receive the data; and
select a first wireless communications network, of the plurality of wireless communications networks, in accordance with the selection information and the one or more measurements, wherein
one of the measurements of the wireless communications interfaces includes an indication of a radio access technology used to transmit the signals on the plurality of the wireless communication networks, and
the circuitry is configured to select the first wireless communications network and to transmit and receive the data in accordance with radio access technology which will minimize the power consumed by the communications terminal.

11. The communications terminal of claim 10, wherein
the circuitry is configured to perform control to attach to the first wireless communications network.

12. The communications terminal of claim 10, wherein
one of the measurements of the wireless communications interfaces includes a stand-by time which the circuitry adopts in a discontinuous reception or transmission mode, and
the circuitry is configured to select the first wireless communications network to transmit and receive signals in accordance with the type of transmission signals which will maximize the stand-by time.

13. The communications terminal of claim 10, wherein the determined one or more measurements include a relative cost of communicating via the first wireless communications network.

14. The communications terminal of claim 10, wherein the circuitry is configured to:
receive adapted selection information providing an adapted rule for selecting a wireless communications network;
determine one or more adapted measurements of the wireless access interfaces in accordance with the adapted selection information; and
select a second wireless communications network, of the plurality of wireless communications networks, which satisfies the adapted rule in accordance with the adapted-determined measurements.

15. The communications terminal of claim 14, wherein the adapted rule corresponds to one or more of a minimum delay, an indication of a relative mobility of the communications terminal, an indication of a relative power which the communications terminal is to consume or an indication of an amount of bandwidth which is required by the communications terminal to communicate the data.

16. The communications terminal of claim 14, wherein the circuitry is configured to transmit one or more parameters to the first wireless communication network, and the adapted selection information is generated based on the one or more parameters.

17. The communications terminal of claim 16, wherein the one or more parameters transmitted to the first wireless network include a relative location of the communications terminal, and the adapted selection information is generated in accordance with the relative location of the communications terminal.

18. The communications terminal of claim 17, wherein the first wireless network is configured to generate the adapted selection information by identifying whether the communications terminal is able to access the first wireless communications network from the relative location of the communications terminal.

19. A method performed by a communications terminal, the method comprising:
transmitting signals via a wireless access interface to an infrastructure equipment for forming a mobile communications network;
receiving signals from the infrastructure equipment via the wireless access interface;
receiving selection information that represents a rule for selecting a wireless communications network, of a plurality of wireless communication networks, in which to transmit or receive data;
determining one or more measurements of wireless access interfaces of the plurality of wireless communications networks to determine which wireless communications network the communications terminal should select to transmit or receive the data; and
selecting a first wireless communications network, of the plurality of wireless communications networks, in accordance with the selection information and the one or more measurements, wherein
one of the measurements of the wireless communications interfaces includes an indication of a radio access technology used to transmit the signals on the plurality of the wireless communication networks, and
the method includes selecting the first wireless communications network and transmitting and receiving the data in accordance with radio access technology which will minimize the power consumed by the communications terminal.

* * * * *